(12) United States Patent
Kim et al.

(10) Patent No.: US 9,981,393 B2
(45) Date of Patent: May 29, 2018

(54) REMOTE ATTACHING AND DETACHING DEVICE INCLUDING CELL CAMERA

(71) Applicants: KOREA ATOMIC ENERGY RESEARCH INSTITUTE, Daejeon (KR); KOREA HYDRO AND NUCLEAR POWER CO., LTD, Gyeongsangbuk-do (KR)

(72) Inventors: Kiho Kim, Daejeon (KR); Jong Kwang Lee, Daejeon (KR); Seung-Nam Yu, Gyeonggi-do (KR); Byung Suk Park, Daejeon (KR); Il-Je Cho, Daejeon (KR); Hansoo Lee, Daejeon (KR)

(73) Assignees: KOREA ATOMIC ENERGY RESEARCH INSTITUTE, Daejeon (KR); KOREA HYDRO AND NUCLEAR POWER CO., LTD., Gyeongsangbuk-do (KR)

( * ) Notice: Subject to any disclaimer, the term of this patent is extended or adjusted under 35 U.S.C. 154(b) by 295 days.

(21) Appl. No.: 14/010,241

(22) Filed: Aug. 26, 2013

(65) Prior Publication Data

US 2014/0055597 A1 Feb. 27, 2014

(30) Foreign Application Priority Data

Aug. 27, 2012 (KR) .................. 10-2012-0093431

(51) Int. Cl.
*B25J 19/02* (2006.01)
*H04N 7/18* (2006.01)
*H04N 5/225* (2006.01)

(52) U.S. Cl.
CPC .......... *B25J 19/023* (2013.01); *H04N 5/2252* (2013.01); *H04N 7/183* (2013.01); *H04N 2005/2255* (2013.01); *Y10S 901/47* (2013.01)

(58) Field of Classification Search
CPC ..... B25J 19/023; H04N 5/2252; H04N 7/183; H04N 2005/2255; Y10S 901/47
(Continued)

(56) References Cited

U.S. PATENT DOCUMENTS

| 4,762,455 A | 8/1988 | Coughlan et al. |
| 5,825,874 A * | 10/1998 | Humphreys ........ B60R 11/0241 379/446 |

(Continued)

FOREIGN PATENT DOCUMENTS

| CN | 2854629 Y | 1/2007 |
| KR | 10-2008-0004043 A | 1/2008 |

(Continued)

*Primary Examiner* — Jorge L Ortiz Criado
*Assistant Examiner* — Yong Joon Kwon
(74) *Attorney, Agent, or Firm* — Maier & Maier, PLLC (57) ABSTRACT

A remote attaching and detaching device which includes a camera module to substitute a worker's vision in such an environment where the worker's direct access to the in-cell is extremely limited or impossible. In a remote attaching and detaching device including a camera module for monitoring operating environment of a slave arm of a remote robot working in hazardous environment, the remote attaching and detaching device includes a fixing module fixed to a proximity of a gripper provided on the slave arm, and the camera module is attachable to and detachable from the fixing module, and provides visual in-cell information or situation about surroundings of the gripper.

9 Claims, 5 Drawing Sheets

(58) Field of Classification Search
USPC .............................................. 348/82; 901/47
See application file for complete search history.

(56) References Cited

U.S. PATENT DOCUMENTS

| | | | | |
|---|---|---|---|---|
| 6,160,905 | A * | 12/2000 | Ahn et al. ..................... | 382/141 |
| 6,234,690 | B1 * | 5/2001 | Lemieux ....................... | 396/419 |
| 6,779,932 | B2 * | 8/2004 | DeSorbo .............. | F16M 11/041 |
| | | | | 396/419 |
| 7,751,092 | B2 * | 7/2010 | Sambongi ............... | G06F 3/005 |
| | | | | 358/473 |
| 8,352,076 | B2 * | 1/2013 | Someya ................. | B25J 9/1697 |
| | | | | 700/245 |
| 8,602,662 | B1 * | 12/2013 | Mans ........................... | 396/428 |
| 2005/0164541 | A1 * | 7/2005 | Joy et al. ...................... | 439/352 |
| 2006/0171704 | A1 * | 8/2006 | Bingle et al. ................. | 396/419 |
| 2007/0058972 | A1 * | 3/2007 | Misawa ................. | G03B 13/02 |
| | | | | 396/541 |
| 2007/0182842 | A1 * | 8/2007 | Sonnenschein .... | A61B 1/00124 |
| | | | | 348/340 |
| 2010/0061711 | A1 * | 3/2010 | Woodman ..................... | 396/428 |
| 2011/0216237 | A1 * | 9/2011 | Shinohara .............. | G03B 17/02 |
| | | | | 348/373 |
| 2014/0027591 | A1 * | 1/2014 | Fountain .................. | 248/226.11 |
| 2014/0044428 | A1 * | 2/2014 | Cuddeback .................. | 396/428 |
| 2014/0252188 | A1 * | 9/2014 | Webster .................. | 248/229.17 |

FOREIGN PATENT DOCUMENTS

| | | |
|---|---|---|
| KR | 10-2012-0052574 A | 5/2012 |
| KR | 10-2012-0068097 A | 6/2012 |

* cited by examiner

REMOTE ATTACHING AND DETACHING DEVICE INCLUDING CELL CAMERA

CROSS-REFERENCE TO RELATED APPLICATIONS

This application claims priority from Korean Patent Application No. 10-2012-0093431, filed on Aug. 27, 2012, in the Korean Intellectual Property Office, the contents of which are incorporated herein by reference in its entirety.

BACKGROUND

1. Field of the Invention

The present invention relates to a remote attaching and detaching device, and more specifically, to a remote attaching and detaching device configured to replace a damaged cell camera with a new one under hazardous working conditions to which direct worker access to the in-cell is highly restricted or impossible.

2. Description of the Related Art

The hot cell, a radiation shielding facility, is generally required when handling radioactive materials such as spent nuclear fuel and the like or conducting experiments using the same. However, it is difficult to operate, maintain, or repair the devices installed in the hot cell or a cell treating hazardous chemicals because a worker cannot have access to the in-cell during an operation due to the toxicity of spent nuclear fuel or chemicals. Thus, the cell is generally installed with multiple tele-manipulators to handle such hazardous materials in a remote manner. The tele-manipulators, fixed in pairs on the upper portion of the shielding window of the cell wall, are used to perform remote operation and maintenance work as required in the cell. In addition to the tele-manipulators, a remote robot may be installed on the ceiling of the cell to expand the scope of remote operation and maintenance required in the cell. The remote robot mainly consists of a master arm and a slave arm. The master arm is installed outside the cell, whereas the salve arm is installed inside the cell. The slave arm of remote robot can move up and down traversing the length and width of the ceiling inside the cell. With the application of remote technology, an operator out-of-cell grasps the master arm with his or her hands and controls the slave arm by simply moving the master arm.

The remote technology is very useful for applications in hazardous or extreme working conditions, e.g. environment involving radioactive materials or limited access, obnoxious working environments such as waste disposal sites, or a dangerous work involving the removal of landmines.

Meanwhile, since the scope of vision secured through the multiple windows is very limited, what is required is additional visual information about the progress and condition of the operation performed inside the cell. Therefore, radiation-resistant cameras and standard cameras are generally installed on a moving object or a structure in the cell to acquire more in-cell vision information.

The radiation-resistant cameras or standard cameras mounted on a crane, wall, or a structure in the cell provide visual information about the inside of the cell to a worker through a monitor outside the cell.

However, there is a limitation in that the radiation-resistant cameras or standard cameras may not be suitable to provide more detailed visual in-cell information or situation to the operator located outside the cell. Further, replacing the cameras remotely when broken down may not be easy. Therefore, it is necessary to develop a device that can provide more detailed in-cell visual information to the operator located outside the cell, and allow easy replacement of components for maintenance and repair purposes when necessary.

SUMMARY OF THE INVENTION

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one embodiment, the present invention provides a remote attaching and detaching device equipped with a camera that can easily secure visual information about the blind spots in a hazardous working space where worker access is extremely-restricted or impossible.

Further, the present invention provides a remote attaching and detaching device equipped with a camera in which a camera module can be replaced easily when it is damaged in the working space, thus increasing continuity and efficiency of work performance.

Furthermore, the present invention provides a remote attaching and detaching device, which reduces time and cost for repairing and maintaining the camera module by use of a tele-manipulating device.

According to one embodiment, the remote attaching and detaching device with the camera module that monitors the working conditions of the slave arm of the remote robot in a hazardous environment includes a fixing module fixed in the proximity of the gripper installed on the slave arm and the camera module attachable to and detachable from the fixing module and providing visual information about the surroundings of the gripper. The camera module includes a housing, a camera fixed in the housing and photographing the visual information, an attaching and detaching unit enabling attachment to or detachment from the fixing module, and a connector connected to the fixing module and receiving and transmitting electric signals from and to the camera.

With the above configuration, visual information about the blind spots of the working space with a extremely-restricted or impossible access of a worker can be easily obtained. Further, the working continuity and efficiency can be increased due to a prompt replacement of a damaged camera module in the working space. Furthermore, using the remote device can considerably reduce time and cost for repairing and maintaining the camera module.

As stated above, the present invention according to one embodiment can easily secure visual information about the blind spots in the working space where worker's access is extremely-restricted or impossible.

Further, the present invention according to one embodiment can increase the working continuity and efficiency since the camera module is easily replaced when it is out of order.

Furthermore, the present invention according to one embodiment can considerably reduce time and cost for repairing and maintaining the camera module.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Reference will now be made in detail to the embodiments of the present invention, the examples of which are illustrated in the accompanying drawings, wherein, like the reference numerals, refer to the like elements throughout. The embodiments are described below to explain the present invention by referring to the figures.

Hereinafter, the remote attaching and detaching device will be described in greater detail with reference to FIGS. 1 to 3.

Figure 1:
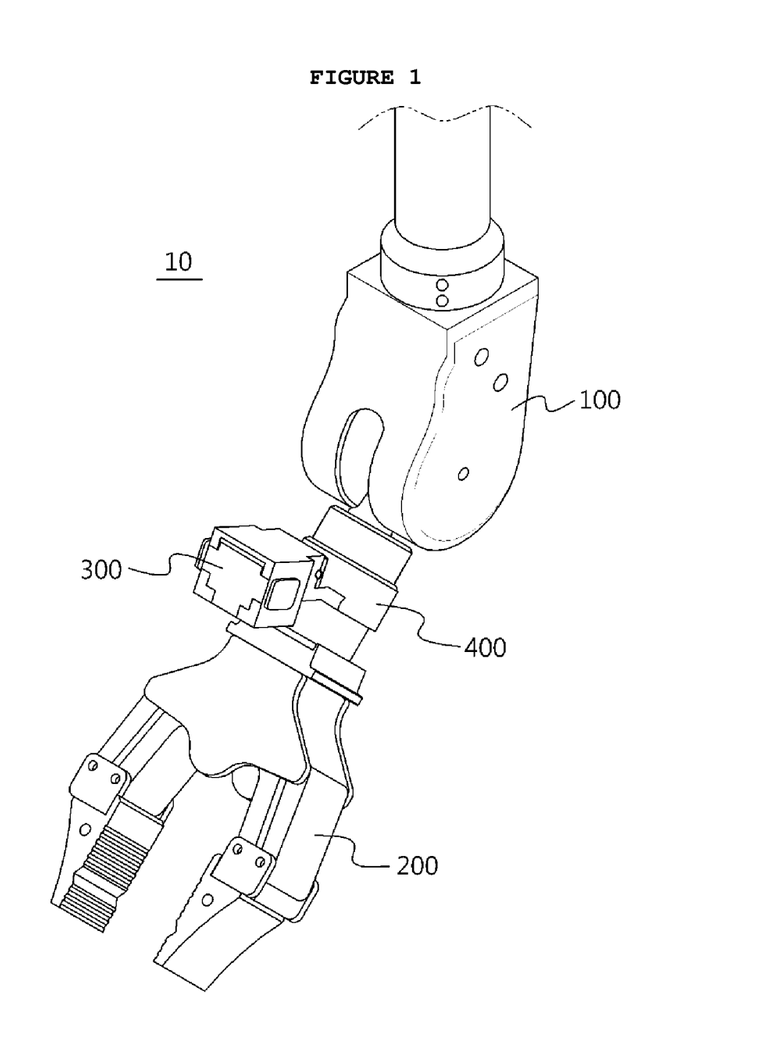
FIG. 1 is a perspective view of a remote attaching and detaching device according to one embodiment of the present invention.

FIG. 1 is a perspective view of a remote attaching and detaching device according to one embodiment of the present invention.

Referring to FIG. 1, the remote attaching and detaching device 10 is equipped with a camera module 300 to monitor the working environment of a slave arm 100 of a remote robot in a hazardous environment, and may include a fixing module 400 fixed in the proximity of a gripper 200 provided on the slave arm 100, and a camera module 300 attachable to and detachable from the fixing module 400 to provide visual information about the surroundings of the gripper 200. The camera module 300 is attachable and detachable through a tele-manipulator 500 controlled remotely by the operator and may transmit the collected visual information or situations to the operator located outside the cell.

The slave arm 100 of the remote robot is installed inside the hot cell for handling radioactive materials such as spent nuclear fuel or the cell treating hazardous chemicals. On the other hand, the master arm (not illustrated) of the remote robot is installed outside the hot cell, or the cell treating hazardous chemicals to be controlled by an operator.

When the operator controls the master arm (not illustrated) of the remote robot, motion signals are converted into electric signals to operate the slave arm 100 remotely. Motions of the master arm (not illustrated) are reproduced at the slave arm.

Further, the slave arm 100 includes the gripper 200 mounted on its wrist. The gripper 200 may move with 6 degrees of freedom, in gripping an object and moving the object to arbitrary desired positions.

The gripper 200 includes an actuator and is operable by the driving force of the actuator to rotate and move. Further, the gripper 200 may take a form of paired fingers to enable gripping movement and cancelling the movement on an object of interest.

Accordingly, the slave arm 100 is operated remotely in accordance with manipulation at the master arm (not illustrated), and able to grip and pick up the object, and rotate and move the object to a desired position.

The fixing module 400 may be positioned in the upper portion of the gripper 200 formed on the slave arm 100. Further, the fixing module 400 may include a fixing ring 411 formed on a lower portion, and a fixing frame 412 in a hexahedral form with one open side formed on an upper portion.

For example, the fixing module 400 may be positioned in the proximity of the gripper 200 and the fixing ring 411 of the fixing module 400 may be inserted in the neck portion of the gripper 200 and fixedly supported thereon. In addition, the camera module 300 may be attached to or detached from the fixing frame 412 formed on the upper portion of the fixing module 400.

The fixing ring 411 of the fixing module 400 may be fixed on the neck portion of the gripper 200 and the camera module 300 may be attached to or detached from the fixing frame 412 on the upper portion of the fixing module 400.

The camera module 300 may be attached to or detached from the fixing module 400 and collect visual information about the surroundings while the gripper 200 performs operation.

For example, the camera module 300 may be attached onto the fixing frame 412 formed on the upper portion of the fixing module 400 and fixed to the fixing module 400.

Further, the camera module 300 may collect visual information about the operation performed by the gripper 200 and the surroundings thereof and transmit the information outside.

Figure 2:
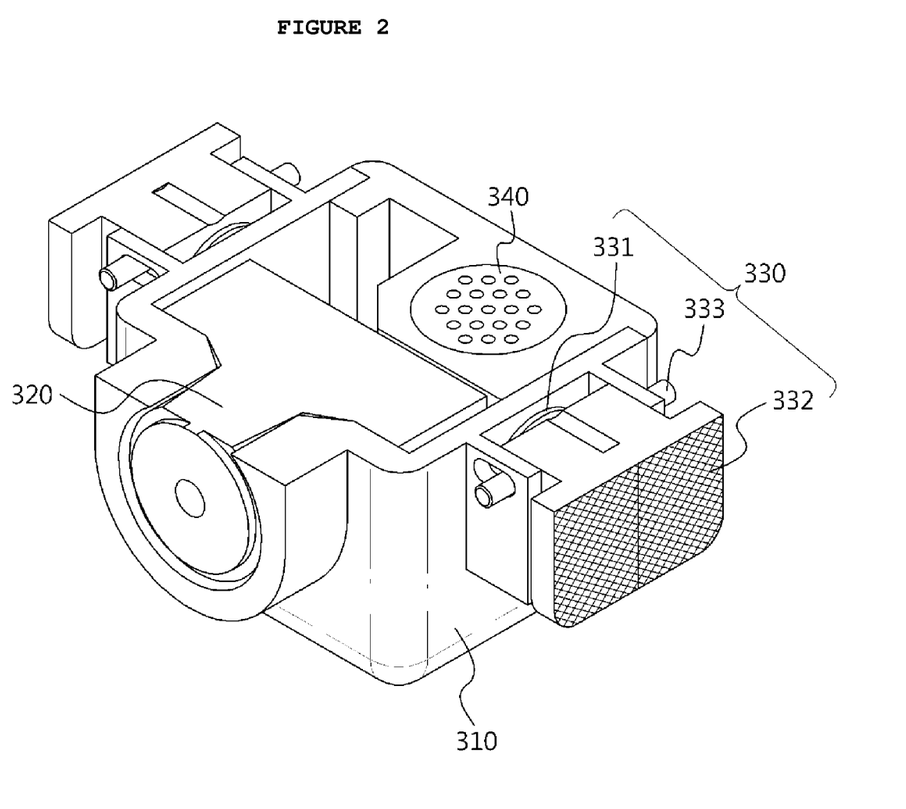
FIG. 2 is a detailed perspective view of a camera module of a remote attaching and detaching device according to one embodiment of the present invention.

FIG. 2 is a detailed perspective view of the camera module of the remote attaching and detaching device according to one embodiment of the present invention.

Referring to FIG. 2, the remote attaching and detaching device 10 including the camera module to monitor the surroundings of the operation performed by the slave arm 100 of the remote robot in a hazardous environment includes a fixing module 400 fixed in the proximity of the gripper 200 of the slave arm 100 and a camera module 300 attachable to and detachable from the fixing module 400 to provide visual information about the surroundings of the gripper 200.

The camera module 300 is attached onto the fixing frame 412 formed on the upper portion of the fixing module 400 and fixed to the fixing module 400. Further, the camera module 300 may collect visual, information about the operation performed by the gripper 200 and the surroundings thereof and transmit the information outside.

To be more specific, the camera module 300 includes a housing 310, a camera 320 fixed in the housing 310 and to photograph visual information, an attaching and detaching unit 330 enabling attachment to and detachment from the fixing module 400, and a connector 340 connected to the fixing module 400 to receive and transmit electric signals from and to the camera 320.

The housing 310 has a predetermined frame form, may house the camera 320 and the connector 340 inserted therein, and include a pair of attaching and detaching units 330 on both side surfaces. One side of the housing 310 may be open to receive a lens portion of the camera 320 therein, while the connector 340 may be positioned on the other side.

Further, the housing 310 may desirably be formed from a material with strong resistance to radiation, and it is preferable that the camera 320 and the connector 340 are sealed inside the radiation-resistant housing 310.

The camera 320 is inserted into the housing 310 with the lens portion of the camera 320 being open to collect the outside visual information.

For example, a CCD camera may be implemented as the camera 320 to collect and provide visual information about the surroundings of the gripper 200. The collected visual information is provided to the operator outside the cell so that the operator is enabled to remotely control the slave arm 100 with the master arm (not illustrated) with accuracy. That is, the operator can accurately pick up or move an object with the gripper 200 of the slave arm, since he or she is provided, in real-time, with the collected visual information. That is, the camera 320 may collect visual information about the surroundings of the gripper 200 and provide the visual information to the operator located outside the cell.

The attaching and detaching unit 330 includes a spring 331, a fastening plate 332 moveable towards a direction of contracting or expanding the spring 331 in accordance with contraction or expansion of the spring 331, and a pin 333 connected to the fastening plate 332 to fix the camera module 300 to the fixing module 400.

For example, the attaching and detaching unit 330 enables the camera module 300 to be attached to detached from the fixing module 400, and may be gripped by the tele-manipulators 500 to attach or detach the camera module 300 when replacing the camera module 300.

That is, the attaching and detaching unit 330 enables the detachment or attachment of the camera module 300 from or to the fixing module 400 so that the camera module 300 can be separated from or fixed to the fixing module 400.

Hereinafter, the constitution of the attaching and detaching unit 330 will be described in greater detail.

The spring 331 of the attaching and detaching unit 330 may be placed vertically with reference to both side surfaces of the housing 310 and connected to the housing 310 or the fastening plate 332. The spring 331 is contracted or expanded in a transversal direction and accordingly can move the fastening plate 332 towards the direction where the spring 331 is contracted or expanded. The spring 331 may have a sufficient elasticity to move the fastening plate 332 towards the direction where the spring 331 is contracted or expanded.

The fastening plate 332 is connected to the spring 331 and may move towards the direction where the spring 331 is contracted or expanded by the contraction or expansion of the spring 331. One side of the fastening plate 332 may include a plurality of embossed portions to prevent slipperiness between the tele-manipulator 500 and the fastening plate 332 when the camera module 300 is gripped with the tele-manipulator 500 to replace the camera module 300. The form of embossing of the fastening plate 332 is not limited to the specific form illustrated in FIG. 2, but implementable as various forms.

The pin 333 is connected to the fastening plate 332 and may fixedly support the camera module 300 inserted into the fixing module 400. The pin 333 moves simultaneously with the fastening plate 332, since the pin 333 is connected to the fastening plate 332. Due to the pin 333, the camera module 300 may be attached to or detached from the fixing module 400 to be fixed or separated.

That is, the camera module 300 may be attached to or detached from the fixing module 400 to be fixed or separated by the spring 331, the fastening plate 332, and the pin 333 which are the components of the attaching and detaching unit 300.

The connector 340 is inserted into the housing 310 and fixedly supported therein, and is connected to the connector 340 formed in the fixing module 400 to transmit or receive driving power and electric signals to or from the camera 320.

For example, the connector 340 may be connected to the camera 320 directly or indirectly, and supply the power and signals to the camera 320. The connector 340 is connected to a connector 420 of the fixing module 400 and may supply externally-received power to the camera 320 through the connector 420 of the fixing module 400. Further, the visual information signals of the camera 320 may be transmitted to the out-of-cell through the connector 340.

Therefore, the visual information collected at the camera 320 may be transmitted and displayed on the monitor located outside the cell through the connector 340, thereby providing an operator in-cell information or situation in real-time.

A female connector may be used as the connector 340 of the camera module 300, while a male connector may be used as the connector 420 of the fixing module 400.

Figure 3:
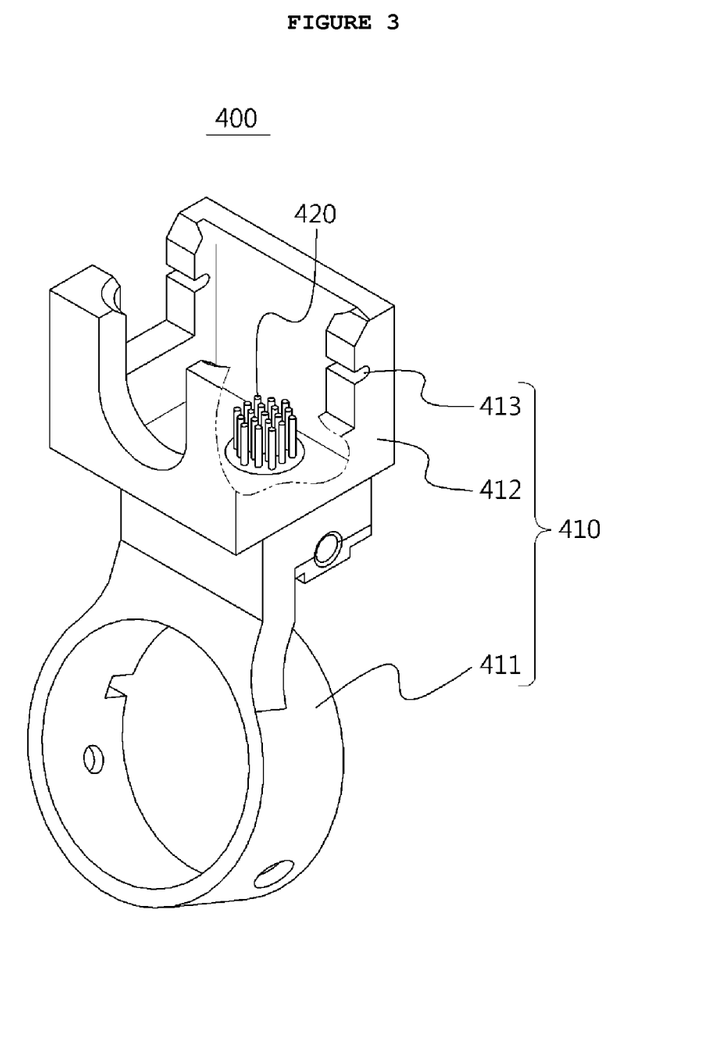
FIG. 3 is a detailed perspective view of a fixing module of a remote attaching and detaching device according to one embodiment of the present invention.

FIG. 3 is a detailed perspective view of the fixing module of the remote attaching and detaching device according to one embodiment of the present invention.

Referring to FIG. 3, the fixing module 400 is fixedly supported on the upper portion of the gripper 200 and includes a clamp housing 410 and a male connector 420.

For example, the fixing module 400 includes the clamp housing 410 and the male connector 420. The clamp housing 410 may be inserted onto the upper portion of the gripper 200 and fixed therein.

To be more specific, the clamp housing 410 may include a fixing ring 411 and a fixing frame 412. The fixing ring 411 and the fixing frame 412 may be connected to each other.

The fixing ring 411 may be formed on the lower portion of the clamp housing 410 and inserted onto the upper portion of the gripper 200 and fixed with a fastening means (not illustrated) such as a bolt.

The fixing frame 412 may be formed on the upper portion of the clamp housing 410, and the camera module 300 may be inserted into the fixing frame 412 and attached thereat. The fixing frame 412 may include a groove 413 formed in a position corresponding to the pin 333 of the camera module 300 so that the pin 333 of the camera module 300 is inserted into the groove 413 when the camera module 300 is attached to the fixing frame 412. When the pin 333 is inserted, the camera module 300 is attached to the fixing frame 412. One side of the fixing frame 412 may be recessed to a 'U' form and the lens portion of the camera 320 may be positioned in the U-form portion.

That is, the clamp housing 410 may be fixed into the gripper 200 and thus attachable to or detachable from the camera module 300.

Meanwhile, the male connector 420 may be positioned on the bottom of the fixing frame 412, and connected to the female connector 340 of the camera module 300.

For example, the male connector 420 may be connected to the female connector 340 of the camera module 300 when the camera module 300 is attached to the fixing module 400 so that external power is supplied to the camera module 300 through the male connector 420. Further, the male connector 420 receives the visual information-related signals sent from the camera module 300 and transmits the information to the external monitor. Therefore, the operator located outside the cell can control the slave arm 100 or the gripper 200 based on the visual information displayed on the monitor.

That is, the fixing ring 411 of the fixing module 400 may be fixed to the neck portion of the gripper 200, the camera module 300 may be attached to or detached from the fixing frame 412 on the upper portion of the fixing module 400, and the male connector 420 may be connected to the female connector 340 of the camera module 300 to transmit power and signals.

Hereinafter, attachment or detachment of the camera module to or from the fixing module according to one embodiment of the present invention will be described in greater detail based on FIG. 4.

Figure 4A:
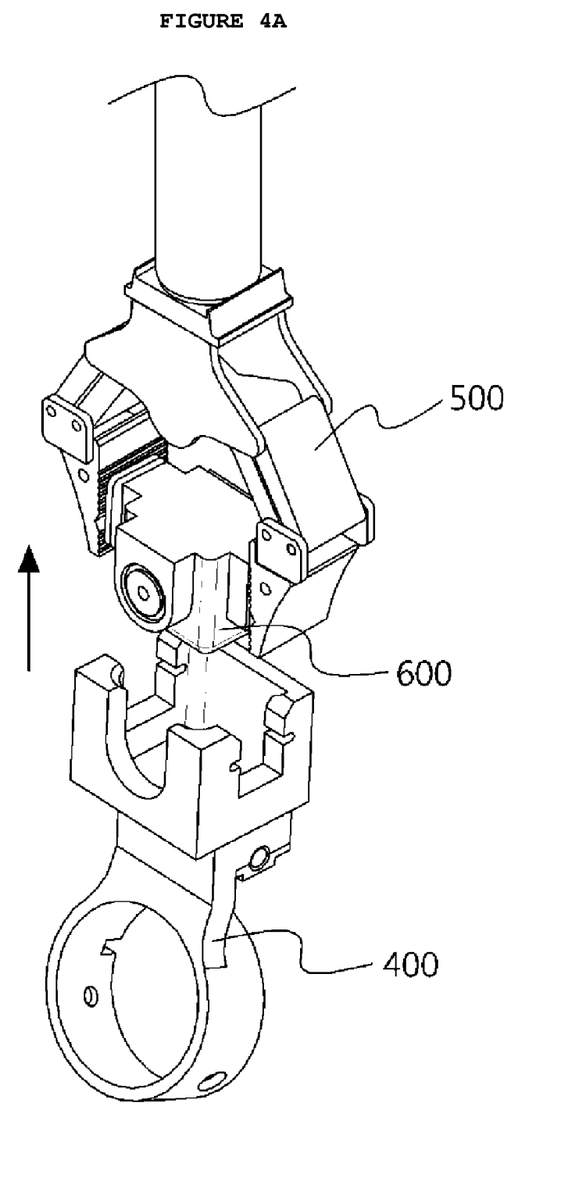
FIG. 4A is a perspective view illustrating a camera module of a remote attaching and detaching device being detached according to one embodiment of the present invention.

FIG. 4a is a perspective view illustrating the camera module of the remote attaching and detaching device replaced according to one embodiment of the present invention.

Figure 4B:
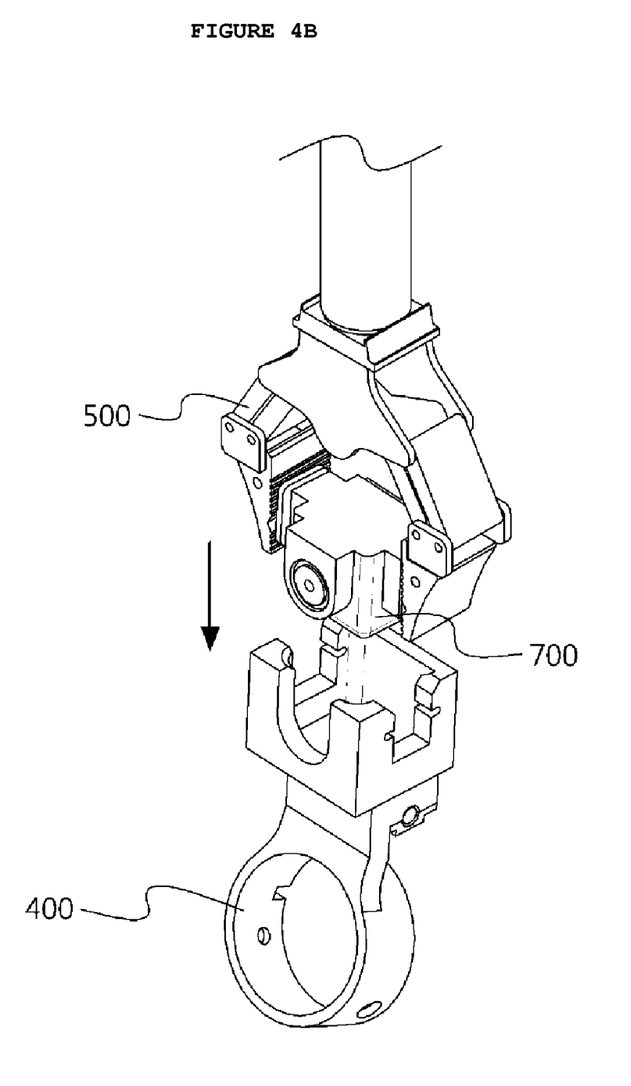
FIG. 4B is a perspective view illustrating a camera module of a remote attaching and detaching device being attached according to one embodiment of the present invention.

Referring to FIG. 4, the remote attaching and detaching device 10 including the camera module 300 for monitoring the surroundings of the slave arm 100 of the remote robot working in a hazardous environment includes a fixing module 400 fixed in the proximity of the gripper 200 formed on the slave arm 100, and a camera module 300 attachable to or detachable from the fixing module 400 to provide visual information about the surroundings of the gripper 200. The camera module 300 may be attached or detached in accordance with the tele-manipulator 500 controlled remotely by the operator and may transmit the collected visual in-cell information or situation to the operator located outside the cell.

The fixing module 400 may be fixedly supported on the upper portion of the gripper 200 and include a clamp housing 410 and a male connector 420. The camera module 300 may include a housing 310, a camera 320 fixed in the housing 310 to photograph visual information, an attaching and detaching unit 330 enabling attachment to and detachment from the fixing module 400, and a connector 340 connected to the fixing module 400 to receive or transmit electric signals from or to the camera 320.

The remote attaching and detaching device 10 is provided inside the cell for treating toxic gas or radioactive materials where a direct worker access to the in-cell is a highly-limited or impossible. The operator can replace the camera module 300 with ease by controlling the tele-manipulator 500 equipped inside the cell remotely from the outside, when the camera module 300 is out of order and requires replacement during gripping or moving operation of the gripper 200 of the remote attaching and detaching device 10.

Hereinafter, the operation of attaching or detaching the camera module to or from the fixing module will be described in greater detail.

FIG. 4A illustrates the camera module detached from the fixing module, and FIG. 4B illustrates the camera module attached to the fixing module.

Referring to FIG. 4A, when the camera module 300 is out of order, the operation of the slave arm 100 of the remote robot is suspended, the camera module 600 is detached from the fixing module 400 according to remote controlling made through the tele-manipulator 500 provided inside the cell, and a new camera module 700 for replacement is then attached.

To be more specific, the tele-manipulator 500 grips both sides of the camera module 600 and presses the fastening plate 332 of the camera module 600 with a predetermined force.

When the tele-manipulator 500 presses the fastening plate 332, the spring 331 connected to the fastening plate 332 is contracted, and simultaneously upon contraction of the fastening plate 332, the pin 333 connected to the fastening plate 332 moves towards the direction where the spring 331 contracts. Accordingly, the pin 333 is separated from the groove 413 of the clamp housing 410.

When the pin 333 is separated, the camera module 600 is in condition for detachment from the fixing module 400. Accordingly, the tele-manipulator 500 raises the camera module 600 vertically while pressing on the fastening plate 332 so that the camera module 600 is detached completely from the fixing module 400. The female connector 340 of the camera module 600 may be detached completely from the male connector 420 of the fixing module 400.

The operation of attaching the new camera module 700 to replace the malfunctioning camera module 600 detached from the fixing module 400 to the fixing module 400 is performed in reverse order from the detachment operation.

Afterwards, the operation of attaching the new camera module continues as follows.

Referring to FIG. 4B, the tele-manipulator 500 grips the fastening plate 332 of the new camera module 700 to be attached to the fixing module 400, while pressing the fastening plate 332, and moves to the fixing module 400 while continuously gripping the fastening plate 332.

The tele-manipulator 500 gripping the camera module 700 descends vertically from the upper portion of the fixing module 400 and inserts the camera module 700 into the fixing frame 412 of the fixing module 400.

To be more specific, the tele-manipulator 500 grips both sides of the camera module 700 and presses the fastening plate 332 of the camera module 700 with a predetermined force. When the tele-manipulator 500 presses the fastening plate 332, the spring 331 connected to the fastening plate 332 is contracted, so that the pin 333 connected to the fastening plate 332 moves towards the direction where the spring 331 contracts simultaneously in accordance with the contraction of the fastening plate 332. As a result, the camera module 700 is attached to the fixing frame 412 of the fixing module 400. When the camera module 700 is completely attached, the tele-manipulator 500 stops pressing the fastening plate 332, thus allowing the fastening plate 332 and the pin 333 to move towards the direction where the spring 331 expands due to the recovery force of the spring 331 connected to the fastening plate 332. As a result, the pin 333 is inserted into the groove 413 of the fixing module 400.

Accordingly, the camera module 700 is attached to and fixed in the fixing module 400, and the female connector 340 of the camera module 700 may be connected to the male connector 420 of the fixing module 400.

Based on the constitution, visual information about the blind spots of the working space with an extremely-limited or impossible worker access can be secured. Further, working continuity and efficiency can be improved due to a prompt replacement of the camera module in the working space when it As out of order. Furthermore, using the remote device can significantly reduce time and cost for maintaining and repairing the camera module.

While the present invention has been particularly shown and described with reference to exemplary embodiments thereof, it will be understood by those skilled in the art that various changes in form and details may be made therein without departing from the spirit and scope of the invention as defined by the appended claims. Therefore, the present invention is not limited to the exemplary embodiments described hitherto, and all claims or modifications considered equivalent to the following claims may belong to the spirit and scope of the present invention.

What is claimed is:
1. A remote attaching and detaching device comprising a camera module for monitoring an operating environment of a slave arm of a remote robot working in a hazardous environment, the remote attaching and detaching device comprising:

a fixing module provided on an upper portion of a gripper provided on the slave arm; and the camera module attachable to and detachable from the fixing module, the camera module for providing visual information about the surroundings of the gripper, wherein the camera module comprises: a housing, a camera fixed to the housing to photograph the visual information, and a pair of detaching units provided on both side surfaces of the housing of the camera module and enabling attaching and detachment to and from the fixing module, wherein the detaching unit comprises a spring, a fastening plate that moves in a direction of contracting or expanding the spring in accordance with contraction and expansion of the spring, and a pin connected to the fastening plate to fix the camera module to the fixing module, wherein the pin moves simultaneously with, and in the same direction as, the fastening plate wherein the fixing module comprises a groove formed in a positon corresponding to the pin so that the pin is inserted into the groove when the camera module is attached to the fixing module wherein the spring is formed between the fastening plate and the housing, wherein the fastening plate is joined to the housing via the pin, wherein the pin is separated from the groove when the fastening plate moves in a direction of contracting the springs, wherein the fixing module includes a recessed portion, and a lens portion is positioned in the recessed portion to collect the visual information.

2. The remote attaching and detaching device of claim 1, wherein the camera module further comprises:

a connector connected to the fixing module to transmit and receive an electric signal to and from the camera.

3. The remote attaching and detaching device of claim 1, wherein the fastening plate comprises a plurality of embossed portions formed on a surface to prevent sliding upon gripping the camera module.

4. The remote attaching and detaching device of claim 2, wherein the connector uses a female connector.

5. The remote attaching and detaching device of claim 1, wherein the camera module transmits collected visual information to an outside area to provide the same to an operator who is in the operating process.

6. A remote attaching and detaching device comprising a camera module for monitoring an operating environment of a slave arm of a remote robot working in a hazardous environment, the remote attaching and detaching device comprising:

a fixing module provided on an upper portion of a gripper provided on the slave arm; and the camera module attachable to and detachable from the fixing module, the camera module for providing visual information about the surroundings of the gripper, wherein the camera module comprises a housing, a camera fixed to the housing to photograph the visual information, and a pair of detaching units provided on both side surfaces of the housing of the camera module and enabling attaching and detachment to and from the fixing module, wherein the detaching unit comprises a spring, a fastening plate that moves in a direction of contracting or expanding the spring in accordance with contraction and expansion of the spring, and a pin connected to the fastening plate to fix the camera module to the fixing module, wherein the pin moves simultaneously with, and in the same direction as, the fastening plate, wherein the fixing module is fixedly supported on the gripper, and comprises a clamp housing comprising a groove formed in a position corresponding to the pin so that the pin is inserted into the groove when the camera module is attached to the fixing module, wherein the spring is formed between the fastening plate and the housing, wherein the fastening plate is joined to the housing via the pin, wherein the pin is separated from the groove when the fastening plate moves in a direction of contracting the spring, wherein the clamp housing further comprises a male connector formed on one side for coupling with a female connector, wherein the fixing module includes a recessed portion, and a lens portion is positioned in the recessed portion to collect the visual information.

7. The remote attaching and detaching device of claim 6, wherein the male connector is connected to an external power source or a control device, to supply power to the camera module and transmit visual in-cell information or situation to the out-of-cell.

8. The remote attaching and detaching device of claim 1, wherein the fixing ring is fixed on the upper portion of the gripper by using a bolt.

9. The remote attaching and detaching device of claim 6, wherein the fixing ring is fixed on the upper portion of the gripper by using a bolt.

* * * * *